(12) United States Patent
Aussem et al.

(10) Patent No.: US 8,482,141 B2
(45) Date of Patent: Jul. 9, 2013

(54) FLOW ENERGY INSTALLATION FOR CONVERTING KINETIC FLOW ENERGY TO ELECTRICAL ENERGY

(75) Inventors: Thomas Aussem, Magstadt (DE); Matthias Koestner, Sachsenheim (DE); Richard Krestel, Leonberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 211 days.

(21) Appl. No.: 13/156,654

(22) Filed: Jun. 9, 2011

(65) Prior Publication Data
US 2011/0304152 A1    Dec. 15, 2011

(30) Foreign Application Priority Data
Jun. 11, 2010 (DE) .......................... 10 2010 017 343

(51) Int. Cl.
*F03B 13/10* (2006.01)
(52) U.S. Cl.
USPC .............................................. 290/43; 290/54
(58) Field of Classification Search
USPC .......................................... 290/43, 44, 54, 55
See application file for complete search history.

(56) References Cited

U.S. PATENT DOCUMENTS

| | | | | | |
|---|---|---|---|---|---|
| 3,928,771 | A | * | 12/1975 | Straumsnes | 290/43 |
| 4,960,363 | A | * | 10/1990 | Bergstein | 415/3.1 |
| 5,969,430 | A | * | 10/1999 | Forrey | 290/54 |
| 7,218,011 | B2 | * | 5/2007 | Hiel et al. | 290/43 |
| 7,511,387 | B2 | * | 3/2009 | Fakhrai | 290/54 |
| 2003/0178855 | A1 | * | 9/2003 | Li | 290/43 |
| 2005/0248162 | A1 | * | 11/2005 | Krouse | 290/54 |
| 2005/0285407 | A1 | * | 12/2005 | Davis et al. | 290/54 |
| 2009/0045632 | A1 | * | 2/2009 | Krauss | 290/54 |

FOREIGN PATENT DOCUMENTS
DE     8434578     5/1985

* cited by examiner

*Primary Examiner* — Tho D Ta
(74) *Attorney, Agent, or Firm* — RatnerPrestia

(57) ABSTRACT

A flow energy installation, in particular a wind power installation, having a housing which has a droplet-shaped cross section and can be adjusted about its vertical axis aligned with the flow direction, in particular the wind direction, wherein the housing has an inlet opening on the front face to an inner flow channel, which leads to at least one outlet opening which is arranged in particular at the side on the housing, and at least one axial incident-flow propeller is arranged in the flow channel, wherein the flow channel has boundary surfaces which run in a convex shape, in its inlet area adjacent to the inlet opening.

19 Claims, 3 Drawing Sheets

FLOW ENERGY INSTALLATION FOR CONVERTING KINETIC FLOW ENERGY TO ELECTRICAL ENERGY

CROSS-REFERENCE TO RELATED APPLICATION

This U.S. patent application claims priority to German Patent Application DE 10 2010 017 343.6-15, filed Jun. 11, 2010, which is incorporated by reference herein in its entirety.

FIELD OF THE INVENTION

The invention relates to a flow energy installation, in particular a wind power installation.

BACKGROUND OF THE INVENTION

Wind power installations are known from the prior art. A wind power installation converts the kinetic energy of the wind to electrical energy, and feeds this into the electrical network. This is done by the energy of motion of the wind flow acting on the rotor blades, thus causing the rotor to rotate. The rotor passes on the rotation energy to a generator, where it is converted to electrical energy.

DE 8434578 U1, which is incorporated by reference, discloses a wind power installation in which two cylindrical blade rotors are arranged at a distance from one another, and the axes of the blade rotors run vertically. The blade rotors are accommodated in a droplet-shaped housing, which consists of three parts. While the two front parts of the blade rotors take in wind, the rear end of the third part forms a wind vane. A wind channel with an inlet opening in the form of a slot, which the blade rotors enter, is formed between the two front parts. Downstream, the wind channel is split at a front, wedge-shaped tip of the third housing part into two branch channels, which lead to outlet openings, in the form of slots, between the first two housing parts and the third housing part.

The flow energy installations known from the prior art do not, however, meet all the requirements, as a result of which the present invention is based on the object of providing a novel flow energy installation with improved power values and a physically simple design at the same time.

SUMMARY OF THE INVENTION

This object is achieved by a flow energy installation, in particular a wind power installation, having a housing which has a droplet-shaped cross section and can be adjusted about its vertical axis aligned with the flow direction, in particular the wind direction, wherein the housing has an inlet opening on the front face to an inner flow channel, which leads to at least one outlet opening which is arranged in particular at the side on the housing, and at least one axial incident-flow propeller is arranged in the flow channel, wherein the flow channel has boundary surfaces which run in a convex shape, in its inlet area adjacent to the inlet opening.

According to aspects of the invention, the flow energy installation, in particular a wind power installation, is provided with a housing which has a droplet-shaped cross section and can be adjusted about its vertical axis in the flow direction, in particular the wind direction. An inlet opening is provided on the front face of an inner flow channel on the housing, leads to at least one, in particular side, outlet opening, and is provided with an axial incident-flow propeller. In its inlet area, the flow channel has boundary surfaces which run in a convex shape. The axial incident flow on the propeller in conjunction with the boundary surfaces which run in a convex shape results in a considerable power increase in comparison to known wind power installations with, for example, inlet slots which are formed straight, since the boundary surfaces which run in a convex shape accelerate the air on the rotor plane. The droplet-shaped base body is always directed in the wind direction, because of its aerodynamic shape. The basic droplet shape results in as little drag as possible. It should be noted that the rear area of the droplet-shaped housing need not run to a point but can also be cut off, in order to achieve a shorter physical shape.

One embodiment provides for the capability of the flow energy installation to have a single flow channel, which preferably starts centrally on the front face of the droplet-shaped housing and then leads to two branching outlet channels with side outlet openings. Starting from the flow channel, the outlet channels extend uniformly outwards and open in associated outlet openings in the respective side housing wall. The basic droplet shape of the housing allows the centrally arranged flow channel (air inlet channel) to be aligned optimally with the wind or the flow direction. In this case, it is aligned with the wind direction automatically, if the vertical axis about which the housing can rotate is arranged in front of the aerodynamic center of pressure, in a side view. Alternatively or additionally, the rotation of the housing may also be positively controlled (for example via a motor drive).

Preferably, at least one propeller is arranged in the flow channel at the narrowest point of the boundary surfaces, which run in a convex manner, thus resulting in as high a flow speed as possible. In this case, the propeller is arranged within the flow channel so as to ensure that the air flow acts completely and over the entire area of the rotor blades. By way of example, the propeller may be mounted on a separate holding frame, and/or may be attached to a surrounding structure within the housing by means of attachment or supporting struts.

A further embodiment provides for the capability to arrange at least one propeller in each of the branching outlet channels. In this case as well, the inlet channel and the outlet channels are designed such that the propellers are located in the area of the smallest overall cross section, and therefore the highest flow speed.

The propeller is preferably in the form of an axial impeller wheel which has an axial incident flow and is arranged centrally in the respective flow channel and/or outlet channel. The advantages of an axial impeller wheel are the small dimensions in comparison to the high required air throughput. The rotation axis of the axial impeller wheel runs parallel to the air flow.

Both embodiments can be accommodated in housings which are in the form of modules which can be joined together and then form a unit. A simple power increase and/or scaling of the flow energy installation can therefore be achieved by addition of individual modules. In principle, the modules which can be combined with one another may also have power levels which differ from one another.

The modules are preferably designed such that they can be joined together to form stacks. By way of example, a continuous mast can be provided for this purpose, onto which the modules are plugged, with the mast at the same time forming the vertical axis of all the modules. Coupling elements are also feasible, which each connect two modules to one another. However, the modules are preferably provided with appropriate surface sections which can be coupled for this purpose and are designed to have complementary shapes to one another. The modules can thus have a straight upper face and/or lower face or else can be provided with projections on one side and with receptacles that are designed to have complementary shapes thereto on the other.

One preferred embodiment provides for the capability for the energy production units of a plurality of joined-together modules to be coupled to one another. In this case, in the following text, an energy production unit should be understood to mean the functional amalgamation of at least one transmission and generator unit, which follows the axial impeller wheel, and power electronics, or a subarea thereof.

In order to couple the joined-together modules on the power side, the energy production units which are provided within the individual modules can be coupled to central power electronics via electrical connections. By way of example, the power electronics make it possible to configure the voltage wave form, the voltage level and the frequency of the electrical energy which is produced. This type of coupling is particularly simple and operationally reliable, since each module autonomously produces electrical power on its own.

Alternatively, the joined-together modules can be coupled on the power side, preferably within a stack, by mechanical coupling of the modules to a common energy production unit, in particular a central generator unit. Depending on the operating conditions, the transmission units can be arranged either in the individual modules or likewise centrally together with the generator unit. This type of coupling offers advantages in terms of weight, and possibly also efficiency.

In this case, the joined-together modules may be arranged as a unit on a mast, which should correspond to the vertical axis of the individual housings. If the incident flow allows, for example when arranged on a higher surface such as a roof, the joined-together modules can also be mounted directly on a base such that they rotate.

The modules and/or stack can be used in many ways. In addition to being installed freely as a flow energy installation, either on the ground, on a roof or on a mast, the stacks can, in particular, also be used decoratively. For example, they can be used as an advertising base. Alternatively, the flow energy installation can be fitted as (dummy) marine-vessel funnel on a marine vessel.

Further advantages, features and details of the invention will become evident from the following description, in which one exemplary embodiment of the invention is described, with reference to the drawings. In this case, the features mentioned in the claims and in the description may each be essential to the invention individually in their own right or in any desired combination.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
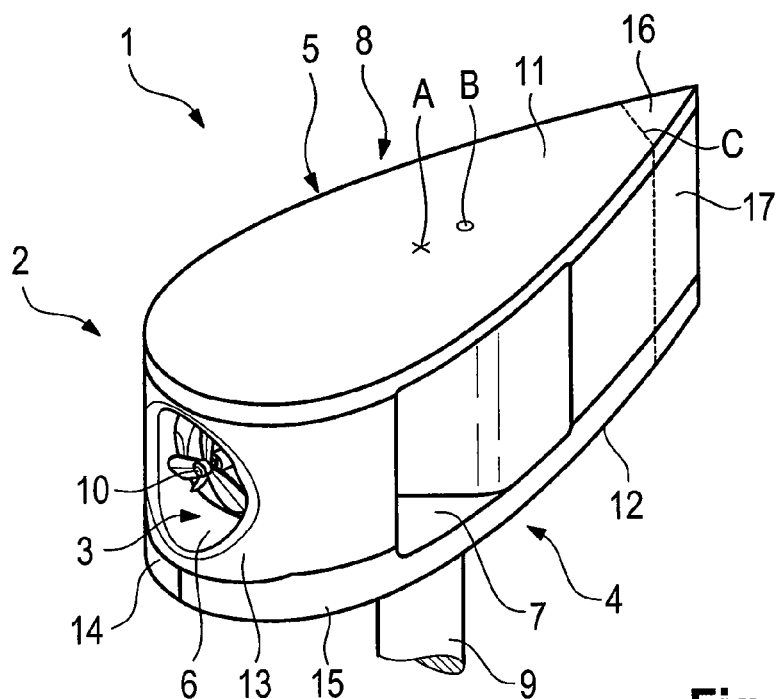
FIG. 1 shows a perspective view of a schematically illustrated flow energy installation according to aspects of the invention.

FIG. 1 shows a perspective view of a schematically illustrated flow energy installation 1. The flow energy installation 1 has a housing 2 with a droplet-shaped cross section, wherein a front-face inlet opening 3 as well as side outlet openings 4, 5 (only 4 can be seen) are provided in the droplet-shaped housing 2.

The front inlet opening 3 is connected to a flow channel 6, in which case, starting from the flow channel 6, two outlet channels 7, 8, which open in the side outlet openings 4, 5, extend within the housing 2. An axial impeller wheel 10 (propeller) is arranged within the flow channel 6, with the diameter of the axial impeller wheel 10 being at least slightly less than the diameter of the flow channel 6.

The housing 2 has a straight upper face 11 and lower face 12, and therefore is in principle designed such that the housings can be stacked. The housing 2 has a substantially integral base body 13 as well as baseplates 14, 15 attached to it, and a cover plate 16. The housing 2 is therefore formed from a number of parts. For example, the rear area 17 of the housing 2 may be in the form of a cavity, in which case, by way of example, the transmission and/or generator units for driving the axial impeller wheel 10 can be arranged in the cavity. The housing 2 is arranged on a mast 9, mounted such that it can rotate, and has a droplet-shaped cross section. A vertical axis A, about which the housing 2 can rotate, is in this case arranged in front of the aerodynamic center of pressure B in the side view, as a result of which the housing 2 is automatically aligned with the air flow when flow acts on it. In this case, the housing 2 need not be in the form of a wedge in its tapering end area, but can also be cut off, as indicated by a dashed line C, in order to achieve a shorter physical shape.

Figure 2:
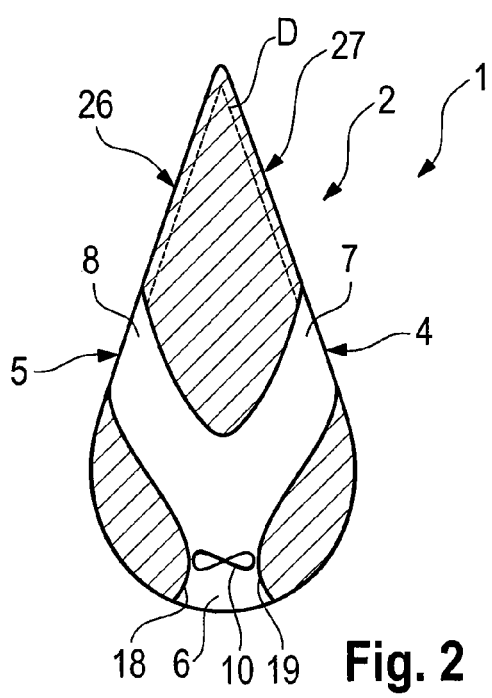
FIG. 2 shows a schematically illustrated section view of the flow energy installation shown in FIG. 1.

FIG. 2 shows a schematically illustrated section view of the flow energy installation 1. The outlet channels 7, 8 branch off from the flow channel 6 and open into the side areas of the housing 2, forming the outlet openings 4, 5. In its inlet area, the flow channel 6 has boundary surfaces 18, 19 which run in a convex shape, with the convex boundary surfaces 18, 19 leading to better flow conditions for the air entering the flow channel 6. The air is distributed like a diffuser into the outlet channels 7, 8, downstream from the axial impeller wheel 10.

In addition, as indicated by the line D, open outlet channels 26, 27 may extend to the outlet openings 4, 5, with these outlet channels 26, 27 being formed in the side areas of the housing 2, and being bounded at the top and bottom by the upper face 11 and the lower face 12.

Figure 3:
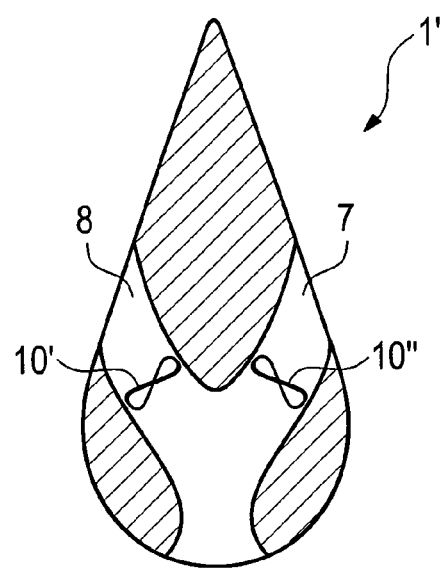
FIG. 3 shows a section view of a further embodiment of a flow energy installation.

FIG. 3 shows a section view of a further embodiment of a flow energy installation 1'. The physical shape and configuration of the flow energy installation 1' are substantially identical to those of the flow energy installation 1 shown in FIG. 1, but with the difference that two axial impeller wheels 10', 10", which are arranged in a respective output channel 7, 8 are provided.

Figure 4:
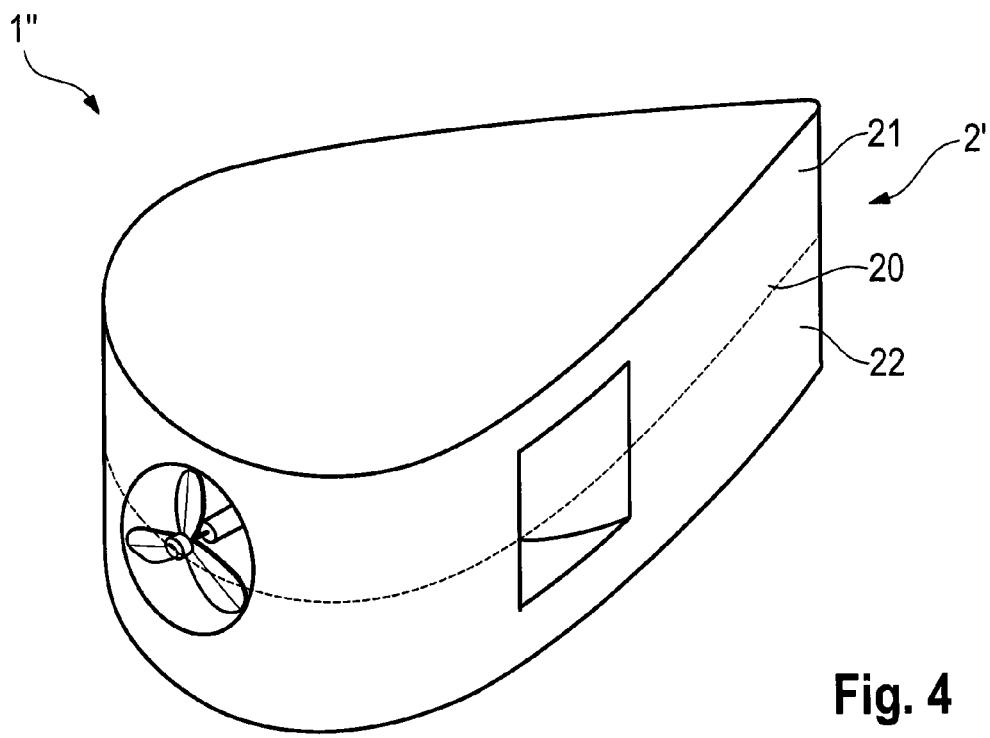
FIG. 4 shows a perspective view of a further embodiment of a flow energy installation.

FIG. 4 shows a further embodiment of a flow energy installation 1", in which the flow energy installation 1" comprises, inter alia, a housing 2' which has a horizontally running substantially central separating plane 20. The housing therefore essentially consists of an upper part 21 and a lower part 22. The design and principle of operation, which are governed by the function, correspond to those of the flow energy installation 1 shown in FIG. 1.

Figure 5:
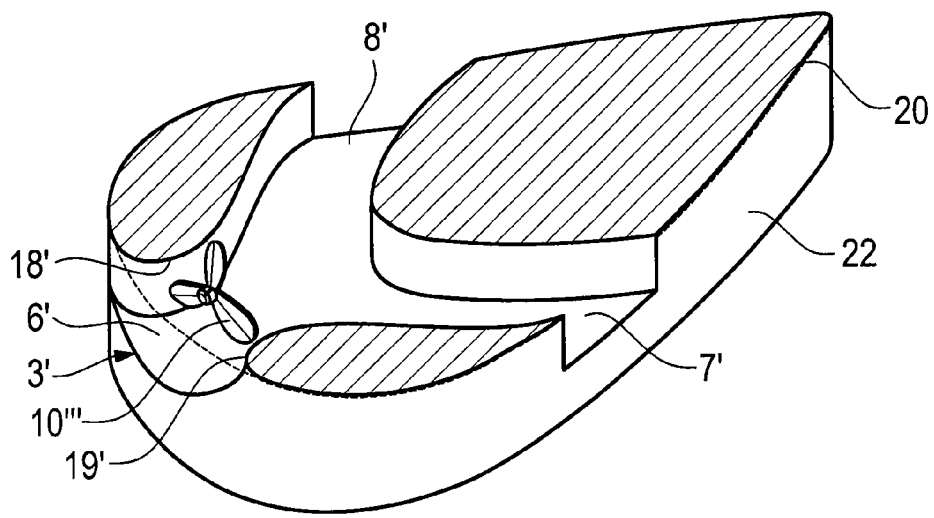
FIG. 5 shows a section view of the flow energy installation shown in FIG. 4.

FIG. 5 shows a section view of a further embodiment as shown in FIG. 4, of the lower part 22, separated on the separating plane 20. This clearly shows the flow channel 6' and the outlet channels 7', 8' as well as the axial impeller wheel 10''' which is arranged in the flow channel 6'. The inlet area around the inlet opening 3' likewise has boundary surfaces 18', 19' which run in a convex shape.

Figure 6:
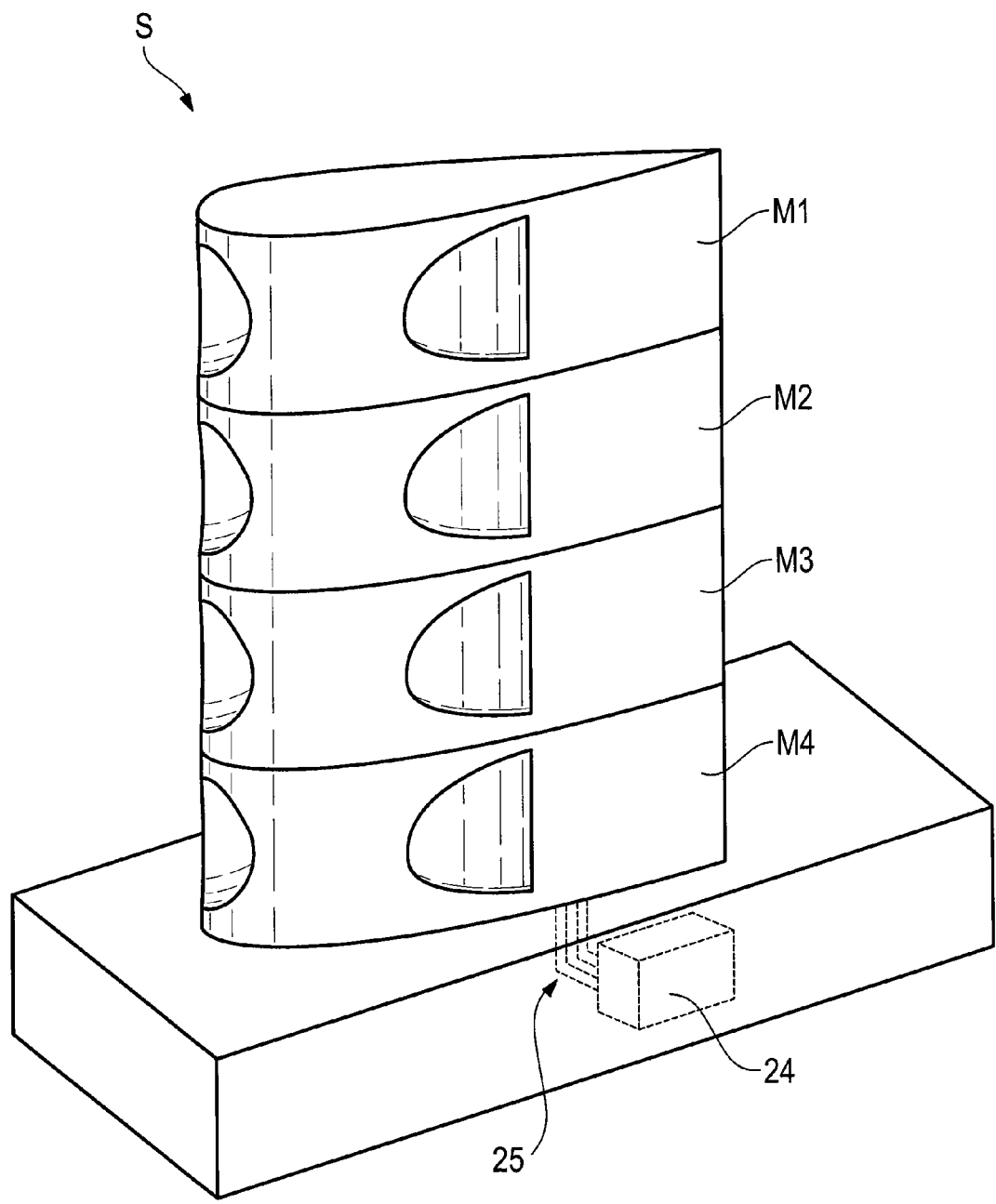
FIG. 6 shows a plurality of individual modules combined to form a stack.

FIG. 6 shows a plurality of modules M1, M2, M3, M4 which have been combined to form a stack S. Each module M1, M2, M3, M4 is in the form of an autonomous flow energy installation, in which case the term module means the functional amalgamation of a housing and energy production unit. The stack S is mounted on a base 23 such that it can rotate, with the base 23 holding power electronics 24. Each module M1, M2, M3, M4 is connected via electrical lines 25 to the power electronics 24, which are connected on the output side to an electrical network, which is not shown.

LIST OF REFERENCE SYMBOLS

1 Flow energy installation
2 Housing
3 Inlet opening
4 Outlet opening
5 Outlet opening
6 Flow channel
7 Outlet channel
8 Outlet channel
9 Mast
10 Axial impeller wheel (propeller)
11 Upper face
12 Lower face
13 Base body
14 Baseplate
15 Baseplate
16 Cover plate
17 Rear area
18 Boundary surface running in a convex shape
19 Boundary surface running in a convex shape
20 Separating plane
21 Upper part
22 Lower part
23 Base
24 Power electronics
25 Electrical line
26 Outlet channel
27 Outlet channel
A Vertical axis
B Aerodynamic center of pressure
C Line
D Line
M1 Module
M2 Module
M3 Module
M4 Module
S Stack

The invention claimed is:

1. A flow energy installation comprising: a housing having a droplet-shaped cross section including a leading face, a trailing face and opposing side surfaces that connect the leading and trailing faces, wherein the housing is configured to be adjusted about its vertical axis that is aligned with a flow direction, wherein the housing has an inlet opening on its leading face that leads to an inner flow channel that is substantially enclosed between a flat top surface and a flat bottom surface, and leads to side outlet openings that are each formed on one of the opposing side surfaces, and wherein the inner flow channel has boundary surfaces which run in a convex shape in an inlet area that is adjacent to the inlet opening, and at least one axial incident-flow propeller arranged in the inner flow channel, wherein an axis of rotation of the at least one axial incident-flow propeller is parallel to a direction of fluid flow through the inner flow channel and the at least one axial incident-flow propeller extends across an entire width of the inner flow channel.

2. The flow energy installation as claimed in claim 1, wherein the propeller is arranged in the narrowest portion of the flow channel.

3. The flow energy installation as claimed in claim 1 for use as an advertising column.

4. The flow energy installation as claimed in claim 1, wherein a single flow channel, which starts centrally on the front face of the droplet-shaped housing and then leads to two branching outlet channels.

5. The flow energy installation as claimed in claim 4 further comprising open outlet channels, each of which are adjacent to a respective side outlet opening in the flow direction, and defined on an exterior of the housing.

6. The flow energy installation as claimed in claim 4, wherein a propeller is in the flow channel in the area of the branching outlet channels.

7. The flow energy installation as claimed in claim 4, wherein at least one propeller is positioned in each of the branching outlet channels.

8. The flow energy installation as claimed in claim 4, wherein the propeller is in the form of an axial impeller wheel that has an axial incident flow and is arranged centrally in a flow channel and/or an outlet channel.

9. The flow energy installation as claimed in claim 1, wherein a plurality of housings are configured to be joined together to form multiple energy production units, wherein each housing is functionally amalgamated with an energy production unit and forms a separate module.

10. The flow energy installation as claimed in claim 9, wherein the modules are configured to be plugged together to form stacks.

11. The flow energy installation as claimed in claim 9, wherein a plurality of energy production units are at least partially functionally joined together.

12. The flow energy installation as claimed in claim 9, wherein the energy production units are arranged within the modules and are coupled via an electrical connection to common power electronics.

13. The flow energy installation as claimed in claim 12, wherein the energy production units are transmission and/or generator units.

14. The flow energy installation as claimed in claim 9, wherein the plurality of modules are mechanically coupled to a common energy production unit.

15. The flow energy installation as claimed in claim 14, wherein the common energy production unit is a common transmission and/or generator unit.

16. The flow energy installation as claimed in claim 1 for use on a marine vessel.

17. The flow energy installation as claimed in claim 16 for use as a marine-vessel funnel.

18. The flow energy installation as claimed in claim 1, wherein the flow energy installation is a wind power installation.

19. The flow energy installation as claimed in claim 18, wherein the flow direction is a wind direction.

* * * * *